US009147427B1

(12) United States Patent
Lee et al.

(10) Patent No.: US 9,147,427 B1
(45) Date of Patent: Sep. 29, 2015

(54) NEAR-FIELD TRANSDUCER WITH MULTIPLE HEAT SINKS

(71) Applicant: Seagate Technology LLC, Cupertino, CA (US)

(72) Inventors: Tae-Woo Lee, Eden Prairie, MN (US); Werner Scholz, Camberwell (AU)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/529,429

(22) Filed: Oct. 31, 2014

(51) Int. Cl.
*G11B 11/00* (2006.01)
*G11B 13/08* (2006.01)
*G11B 5/48* (2006.01)
*G11B 5/31* (2006.01)
*G11B 5/60* (2006.01)
G11B 5/00 (2006.01)

(52) U.S. Cl.
CPC .............. *G11B 13/08* (2013.01); *G11B 5/314* (2013.01); *G11B 5/4866* (2013.01); *G11B 5/6088* (2013.01); *G11B 5/3133* (2013.01); *G11B 2005/0021* (2013.01)

(58) Field of Classification Search
CPC ........... G11B 2005/0021; G11B 5/314; G11B 5/4866; G11B 13/08; G11B 5/6088; G11B 5/3133; G11B 5/1278; G11B 2005/0005

USPC .......... 369/13.33, 13.13, 13.24, 13.03, 13.12, 369/13.22, 13.01, 112.27
See application file for complete search history.

(56) References Cited

U.S. PATENT DOCUMENTS

| 8,320,219 | B1 | 11/2012 | Wolf et al. | |
| 8,451,705 | B2 | 5/2013 | Peng et al. | |
| 8,462,594 | B1 | 6/2013 | Aoki et al. | |
| 8,488,419 | B1 | 7/2013 | Jin et al. | |
| 8,599,656 | B2 | 12/2013 | Jin et al. | |
| 8,619,516 | B1 | 12/2013 | Matsumoto | |
| 8,705,323 | B2* | 4/2014 | Contreras et al. | 369/13.32 |
| 2012/0163139 | A1* | 6/2012 | Vavra et al. | 369/13.33 |

* cited by examiner

*Primary Examiner* — Ali Neyzari
(74) *Attorney, Agent, or Firm* — Hollingsworth Davis, LLC

(57) ABSTRACT

An apparatus comprises a writer, a near-field transducer (NFT), a channel waveguide proximate the NFT, a dielectric layer between the NFT and waveguide, and a plurality of heat sinks. A first heat sink comprises a gap and contacts the NFT and the writer. A second heat sink extends across the gap of the first heat sink and between the NFT and a heat reservoir component, such as a return pole of the writer. The channel waveguide may contact the second heat sink, such as by encompassing a peripheral portion of the second heat sink. The second heat sink may have at least an outer surface comprising a plasmonic material, and may be configured to enhance plasmonic excitation of the NFT.

20 Claims, 5 Drawing Sheets

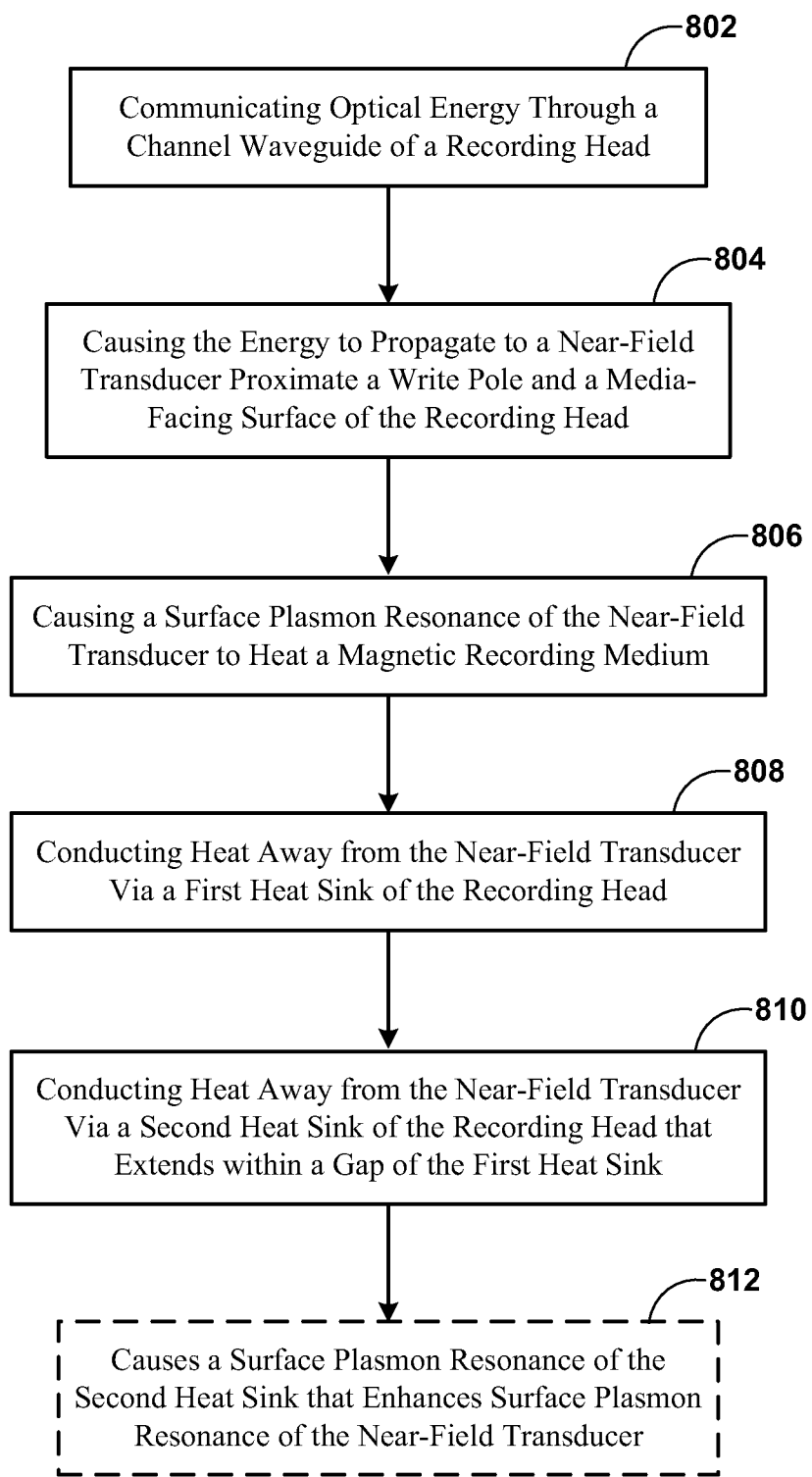

NEAR-FIELD TRANSDUCER WITH MULTIPLE HEAT SINKS

SUMMARY

Embodiments of the disclosure are directed to an apparatus comprising a writer, a near-field transducer (NFT), a channel waveguide proximate the NFT, a dielectric layer between the waveguide and the NFT, and a plurality of heat sinks. The dielectric layer has a refractive index lower than that of the waveguide. A first heat sink comprises a gap and contacts the NFT and the writer. A second heat sink extends across the gap of the first heat sink and between the NFT and a heat reservoir component, such as a return pole of the writer. The channel waveguide may contact the second heat sink, such as by encompassing a peripheral portion of the second heat sink. The second heat sink may have at least an outer surface comprising a plasmonic material, and may be configured to enhance plasmonic excitation of the NFT.

According to some embodiments, an apparatus includes a writer comprising a write pole and a return pole, and an NFT comprising an enlarged region having a first surface, a second surface, and a peg region extending from the enlarged region. A first heat sink comprises a gap and contacts the write pole, the return pole, and the NFT. A second heat sink extends across the gap of the first heat sink and between the first surface of the enlarged region of the NFT and the return pole. An optical waveguide is situated proximate the first surface of the NFT and a portion of the second heat sink. A dielectric layer is disposed between the waveguide and the NFT, and has a refractive index lower than that of the waveguide. The waveguide may contact the second heat sink, such as by encompassing a peripheral portion of the second heat sink. The second heat sink may have an outer surface comprising a plasmonic material, and may be configured to enhance plasmonic excitation of the NFT.

In accordance with other embodiments, an apparatus includes a slider of a heat assisted magnetic recording head, a writer on the slider comprising a write pole and a return pole, and an NFT on the slider. The NFT comprises an enlarged region having a first surface and a peg region extending from the enlarged region. The apparatus also includes a first heat sink on the slider comprising a gap. The first heat sink contacts a portion of the writer and a portion of the NFT. The apparatus further includes a second heat sink that extends across the gap of the first heat sink and between the first surface of the enlarged region of the NFT and a heat reservoir component of the slider, such as the return pole. An optical waveguide is situated proximate the first surface of the NFT and contacts a portion of the second heat sink. A dielectric layer is disposed between the waveguide and the NFT, and has a refractive index lower than that of the waveguide.

Embodiments are directed to a method involving communicating optical energy through a channel waveguide of a recording head, and causing the energy to propagate to a near-field transducer proximate a write pole and a media-facing surface of the recording head, the energy causing a surface plasmon resonance of the near-field transducer to heat a magnetic recording medium. The method also involves conducting heat away from the near-field transducer via a first heat sink of the recording head, and further involves conducting heat away from the near-field transducer via a second heat sink of the recording head that extends across a gap of the first heat sink. In some embodiments, the energy causes a surface plasmon resonance of the second heat sink that enhances surface plasmon resonance of the near-field transducer.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 8 is a flow diagram of a method of managing thermal conditions at a near-field transducer of a HAMR head in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

This disclosure is generally directed to a near-field transducer and apparatuses and methods for managing thermal conditions at the near-field transducer. This disclosure is also directed to an arrangement that includes a near-field transducer and a channel waveguide, and apparatuses and methods for managing thermal conditions at the near-field transducer. Heat-assisted, magnetic recording, also referred to as energy-assisted media recording (EAMR), thermally-assisted media recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to bits randomly changing state.

In order to achieve desired data density, a HAMR recording head (e.g., slider) includes optical components that direct light from a laser diode to the recording medium. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near-field transducer (NFT), such as a plasmonic optical antenna. The NFT is designed to support local surface plasmon excitation at a designed light wavelength. At resonance, high electric field surrounds the NFT due to the collective oscillation of electrons in the metal. Part of the field will tunnel into a storage medium and get absorbed, raising the temperature of the medium locally for recording. During recording, a write element (e.g., write pole) applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

Figure 1:
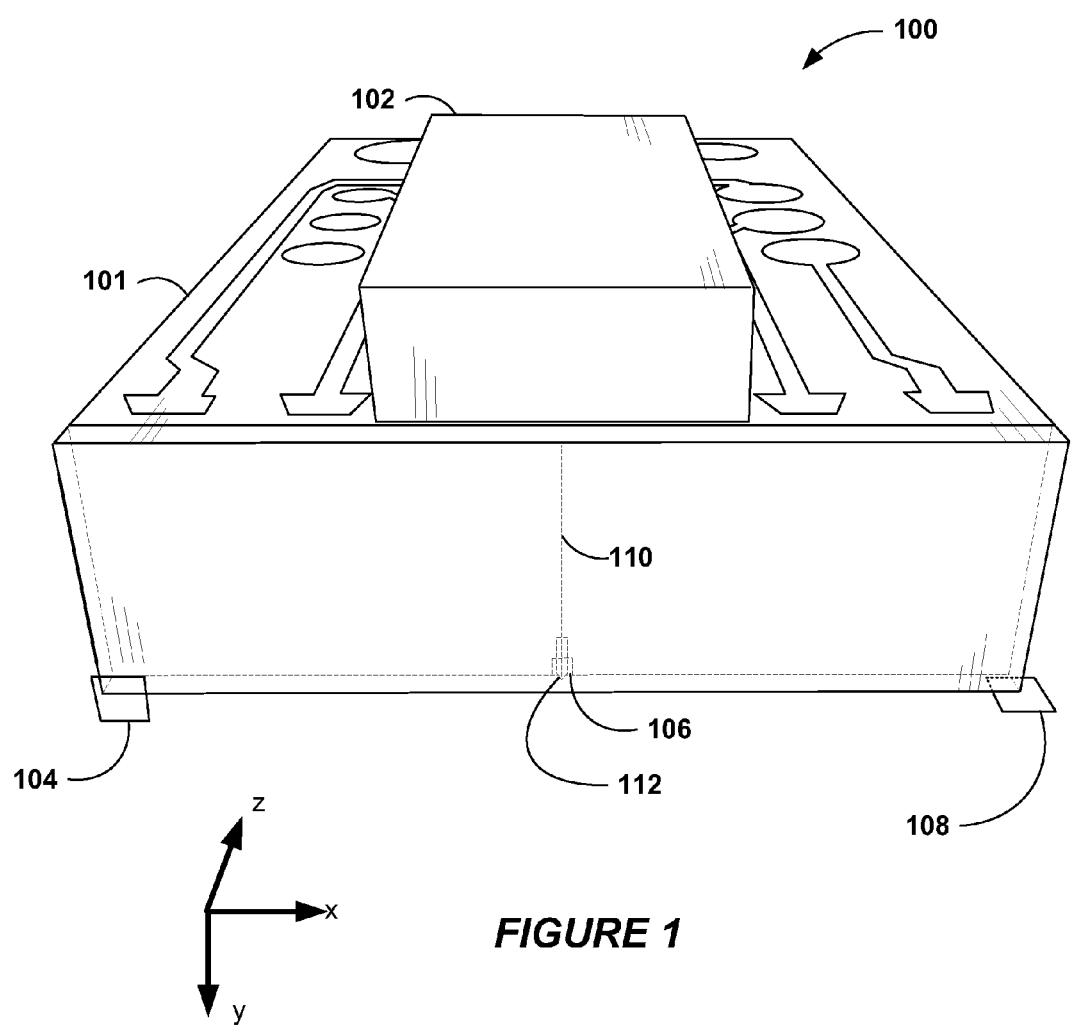
FIG. 1 is a perspective view of a hard drive slider that includes a near-field transducer with multiple heat sinks in accordance with various embodiments.

With reference now to FIG. 1, a perspective view shows a HAMR hard drive slider 100 that may be implemented in accordance with various embodiments of the disclosure. The HAMR slider 100 (also referred to as a read/write head, recording head, read head, write head) utilizes an energy source, which in this example is a laser diode 102 located on top of and proximate to a trailing edge surface 104 of a slider body 101. The laser diode 102 delivers light proximate to a read/write transducer 106, which is proximate an air-bearing surface (ABS) 108 (also referred to as a media-facing surface) of the slider body 101. The media-facing surface 108 is held proximate to a moving magnetic medium surface (not shown) during device operation. The read/write transducer 106 may include, among other things, a magnetoresistive reader element and a magnetic write coil that energizes a write pole (e.g., a writer).

The laser diode 102 provides electromagnetic energy to heat the magnetic medium surface as it passes by the read/write transducer 106. Optical coupling components, such as a channel waveguide 110 and a plasmonic NFT 112, are formed integrally within the HAMR slider 100 to deliver light from laser diode 102 to a region proximate the read/write transducer 106. The light energizes the NFT 112, which provide local heating of the recording medium during write operations. The laser diode 102 in this example may be an integral, edge-emitting device, although it will be appreciated that the waveguide 110 and NFT 112 may be used with any light source. For example, a surface emitting laser (SEL) may be used instead of an edge-emitting laser, and a laser may be mounted elsewhere, or in different orientation, e.g., on the trailing edge surface 104 of the slider body 101.

While the embodiment illustrated in FIG. 1 shows the laser diode 102 integrated with the HAMR slider 100, the waveguide 110 and NFT 112 discussed herein may be useful in any type of light delivery configuration. For example, in what is referred to as free-space light delivery, a laser may be mounted externally to the slider, and coupled to the slider by way of optic fibers and/or waveguides. The slider in such an arrangement may include a grating coupler into which light is coupled and delivered to a slider-integrated waveguide 110 which energizes NFT 112.

The waveguide 110 extends from the media-facing surface 108 towards the laser diode 102. There may be intermediary optical components between the laser diode 102 and waveguide 110, such as lenses, mirrors, collimators, phase-shifters, other waveguides, etc. For purposes of this discussion, the waveguide 110 will refer to a contiguous light propagation conduit that delivers light energy proximate to the NFT, the light originating either directly from the laser diode 102 or indirectly via some other intermediary optical component.

Figure 2:
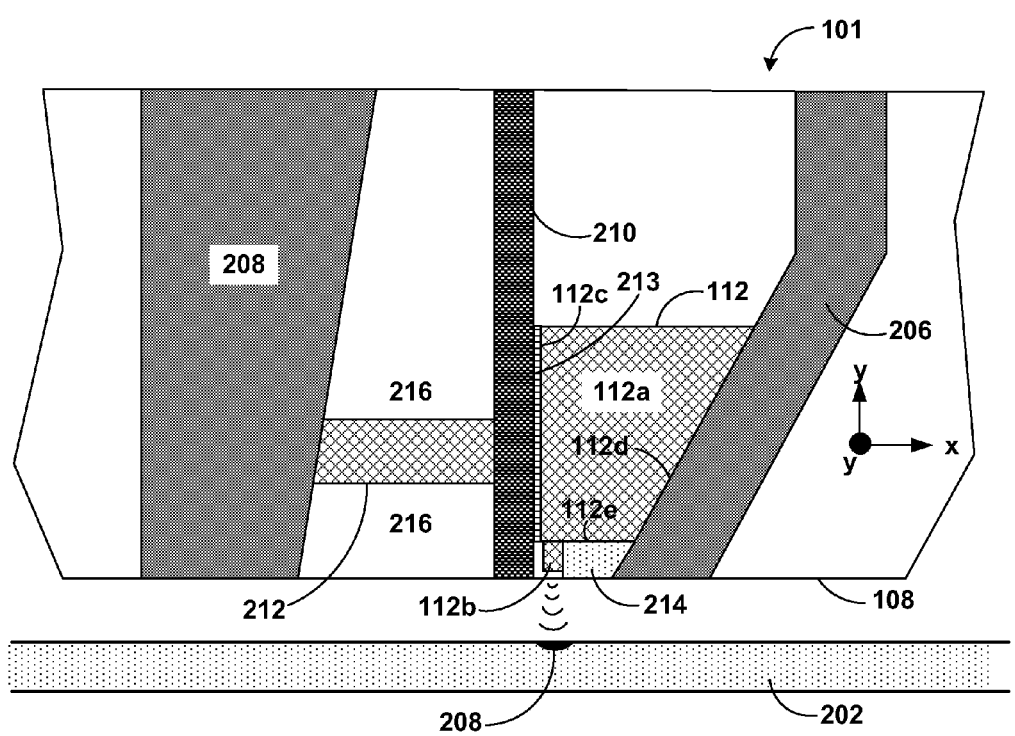
FIG. 2 is a cross-sectional view of a slider that includes a near-field transducer with multiple heat sinks in accordance with various embodiments.

In FIG. 2, a cross-section diagram illustrates features of a slider body 101 according to a representative embodiment of the disclosure. The cross-section of the slider body 101 shows a number of components, including a magnetic write pole 206 of a writer, an NFT 112, a channel waveguide 210, and a magnetic return pole 208 of the writer. The NFT 112 is located proximate a media-facing surface 108 (e.g., ABS), which is shown near a recording medium 202 during device operation, e.g., a magnetic disk. The elongated waveguide 210 is shown disposed proximate the NFT 112, with the NFT 112 being located at or near the media-facing surface 108. Disposed between the NFT 112 and the waveguide 210 is a thin dielectric layer 213. In various embodiments, the dielectric layer 213 has a refractive index lower than that of the channel waveguide 210.

During operation, light propagates through the waveguide 210 along the negative y-direction. Electrical field lines emanate from the waveguide 210 and excite the NFT 112. The NFT 112 delivers surface plasmon-enhanced, near-field electromagnetic energy along the negative y-direction where it exits at the media-facing surface 108. This results in a highly localized hot spot 208 on the recording medium 202. Further illustrated in FIG. 2 is write pole 206 that is located alongside a sloped surface of the NFT 112. Write pole 206 generates a magnetic field (e.g., perpendicular field) used in changing the magnetic orientation of the hotspot 208 during writing.

The waveguide 210 is a channel waveguide configured to receive electromagnetic energy from an energy source (e.g., laser 102 in FIG. 1). According to some embodiments, the waveguide 210 includes a layer of core material surrounding by cladding layers. The core layer and cladding layers may be made from dielectric materials. The materials are selected so that the refractive index of the core layer is higher than refractive indices of the cladding layers. This arrangement of materials facilitates efficient propagation of light through the waveguide 210. Optical focusing elements (not shown) such as mirrors, lenses, etc., may be utilized to concentrate light onto the NFT 112.

The electromagnetic energy induces surface plasmon resonance at the NFT 112, and the surface plasmons are directed to create a small hotspot 208 (e.g., 60 nm or smaller) on a recording medium 202 as it moves past the NFT 112 in the downtrack direction (z-direction). The heat lowers magnetic coercivity of the medium 202, allowing a magnetic flux to change magnetic orientation of the medium 202 near the hotspot 208 without changing magnetic orientation outside of the hotspot 208. A write pole 206 applies the magnetic flux near the media-facing surface 108 in response to applying a current to coils (not shown) magnetically coupled to the write pole 206. Because the energy is focused in a relatively small volume of the slider body 101, significant temperature increases are seen near the NFT 112 during recording. This is due to, among other things, optical inefficiency of the energy transmission path and absorption of energy in the NFT 112 and its vicinity.

The NFT 112 shown in FIG. 2 includes an enlarged region 112a and a peg region 112b, both of which are at least partially covered with a thin layer of plasmonic material. Typical plasmonic materials include at least one of aluminum, silver, copper, gold, and alloys thereof. Gold is a typically used material due to its good mechanical properties, coupling efficiency and its ability to generate surface plasmons. In the context of describing the NFT 112, the term "region" is used interchangeably with "portion" and refers to a bounded three-dimensional feature in which the boundaries may either be physical boundaries or may be arbitrarily chosen for exemplary reasons. Representative NFTs can include a disk-shaped enlarged region (e.g., region 112a) that can be made of a plasmonic metal and is configured to receive optical energy from the waveguide 210.

The enlarged region 112a of the NFT 112 has a first surface 112c proximate the channel waveguide 210. A gap is provided between the first surface 112c of the NFT 112 and the channel waveguide 210. A thin layer of dielectric material fills this gap and has a refractive index lower than that of the waveguide core. The enlarged region 112a of the NFT 112 has a second surface 112d adjacent to or in contact with the write pole 206. The peg region 112b of the NFT 112 is in contact with at least a portion of a base side 112e of the enlarged region 112a. The peg region 112b extends from enlarged region 112a towards the media-facing surface 108. The peg region 112b is in optical and/or electrical communication with the disk-shaped enlarged region 112a and creates a focal point for the energy received by the enlarged region 112a. The enlarged region 112a of the NFT 112 is shaped to condense the field and the peg region 112b is designed to resonate such that the NFT efficiency is enhanced on one hand, and on the other hand scattering of the field is reduced along the circumference of the enlarged region 112a. The end peg region 112b protrudes out from the enlarged region 112a near the media-facing surface 108. This protrusion can improve NFT efficiency and thermal gradient for writing sharp magnetic transitions of the recording medium 202. Surface plasmon waves are generated mainly at surfaces of peg region 112b and the enlarged region 112a nearest channel waveguide 210. The tip of the peg region 112b may have different cross-section and or size from the body of the peg region.

During operation, the NFT 112 experiences a significant temperature rise. Modeling (e.g., finite element analysis of heat flow) has shown that the temperature rise is highest in the peg region 112b of the NFT 112. The models indicate that the electromagnetic field generated within the NFT 112 during the recording operation is highest within the peg region 112b. Models show that the amplitude of the electromagnetic field is directly proportional to the energy absorption level. The disclosed plasmonic NFTs incorporate a heat sink arrangement for cooling the NFT 112. Management of thermal conditions at the NFT 112 is facilitated by use of a multiplicity of heat sinks in accordance with various embodiments.

Temperature reduction of the NFT 112 is important for improving the reliability of HAMR. A heat sink contacting the NFT 112 can generally be used to reduce NFT temperatures during operation. By its nature, it is almost impossible to heat up the recording medium without significant power absorption in the NFT which also raises recording head temperature. A well-designed heat sink can help dissipate heat from the NFT and lower recording head temperature, thereby improving reliability.

Important considerations in the proper design of a heat sink are increasing (e.g., maximizing) heat flow from the NFT 112 to an ambient medium and reducing (e.g., minimizing) any optical performance degradation caused by light interaction with the heat sink. Various embodiments of the disclosure are directed to new heat sink arrangements developed and demonstrated for "NFT-above-CWG" (near-field transducer-to-channel waveguide) light delivery. A significant improvement in media-to-head temperature ("MH") ratio can be achieved while retaining and/or improving media temperature rise efficiency and thermal gradient in recording media compared with conventional heat sink approaches. According to some embodiments, the heat sink arrangement can include plasmonic material, which can increase HAMR performance with the added benefit of lowering recording head temperature.

Embodiments of the disclosure are directed to heat sink arrangements that provide for a large reduction in recording head temperature and also take advantage of features in channel waveguide NFT excitation. Embodiments of a channel waveguide and NFT arrangement can provide for an enlarged bottom surface of the NFT that allows an additional heat sink to be installed directly under the bottom surface of NFT, which can also serve as an auxiliary plasmonic component. According to some embodiments, a first heat sink is attached to the NFT and a magnetic write pole of a writer on the slider, and a second heat sink is attached to the NFT and extends outwardly to contact a heat reservoir component of the slider, such as a return pole of the writer. In various embodiments, the second heat sink directly contacts a bottom surface of the NFT and provides direct heat-flow from the NFT to the heat reservoir component of the slider. According to some embodiments, the second heat sink includes a high thermal conductivity plasmonic material, such as Au, and serves to boost local hot spot intensity as well as lowering the recording head temperature. NFT heat sink arrangements that include a second heat sink as described herein can be implemented to include or exclude plasmonic material.

With continued reference to FIG. 2, the NFT 112 includes a first heat sink 214 (partially shown in FIG. 2, best seen in FIG. 6) that contacts the enlarged region 112a of the NFT 112 proximate the peg region 112b and also contacts a write return pole 208 of the writer on the slider body 101. It is noted that contact between the first heat sink 214 and the return pole 208 is not seen in FIG. 2 due to presence of a gap 216 in the first heat sink 214, but can be seen in FIG. 6. In some embodiments, the first heat sink 214 contacts the enlarged region 112a of the NFT 112, the return pole 208, and the write pole 206 of the writer. The NFT 112 has a bottom surface 112c (also referred to as a first surface of the NFT 112) in abutment with a distal portion of the channel waveguide 210. In comparison to an NFT with SIM (solid immersion mirror) excitation, an NFT-above-CWG light delivery arrangement such as that shown in FIG. 2 frees up area on both sides of the channel waveguide 210 (see, e.g., FIGS. 4 and 5). The NFT-above-CWG light delivery arrangement allows for a larger NFT to be incorporated in a given slider body 101 as compared to an NFT with a SIM excitation arrangement. The larger size NFT 112 enables high order local surface plasmon excitation with CWG light delivery on the order of several times (e.g., 2 times, 3 times, or 4 times) that which can be achieved using an NFT with SIM excitation arrangement within the same space constraints of the slider body 101.

The larger size NFT 112 provides space to attach a second heat sink 212 to the bottom surface 112c of the NFT 112. The second heat sink 212 preferably extends directly from the bottom surface 112c of the NFT 112, continues through a portion of the waveguide 210, and terminates at a heat reservoir component of the slider body 101, such as a write return pole 208 as shown in FIG. 2. In some embodiments, the second heat sink 212 is formed from, or otherwise includes a surface comprising, a plasmonic material, which provides increased local surface plasmon excitation of the NFT 112. As discussed previously, local surface plasmon excitation of the second heat sink 212 can increase local surface plasmon excitation of the NFT 112 by a factor of two, three, or four, for example.

Figure 3:
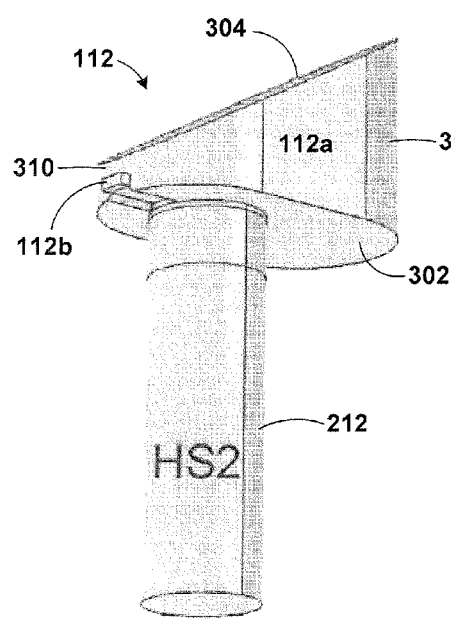
FIG. 3 is a perspective view of a near-field transducer which includes a heat sink that optionally serves as an auxiliary plasmonic component in accordance with various embodiments.

FIG. 3 is a perspective view of an NFT 112 which includes a heat sink 212 that optionally serves as an auxiliary plasmonic component in accordance with various embodiments. In the embodiment shown in FIG. 3, the NFT 112 includes a substantially planar first or bottom surface 302 and an opposing sloped second or top surface 304. The NFT 112 further includes a first side surface 310 and an opposing second side surface 312. The volume between the first and second side surfaces 310 and 312 has a generally elongated oval shape. A peg region 112b extends outwardly from the first side surface 310. The peg region 112b typically has a length defined normal to the first side surface 312 of the NFT 112 of between about 10 to 60 nm. According to some embodiments, the NFT 112 has a length defined between the first and second side surfaces 310 and 312 of about 400 to 700 nm, and a width of about 300 to 500 nm. The NFT 112 of the NFT-above-CWG arrangement shown in FIG. 3 has a bottom surface area that is about 2 to 6 times larger than that of a conventional NFT with a SIM excitation arrangement for the same slider body 101.

In the embodiment shown in FIG. 3, the second heat sink 212 has a generally columnar shape, and is illustrated as a cylindrical post extending generally normal from the bottom surface 302 of the NFT 112. In the embodiment shown in FIG. 3, the second heat sink 212 is biased toward the peg region 112b of the NFT 112 due to the production of higher temperatures at and near the peg region 112b relative to other portions of the NFT 112. The volume of the second heat sink 212 can be about the same as, less than, or greater than that of the NFT 112. In some embodiments, the second heat sink 212 has a surface area that supports local surface plasmon excitation that is roughly equivalent to that of the NFT 112. In other embodiments, the second heat sink 212 has a surface area that supports local surface plasmon excitation that is greater than that of the NFT 112 (e.g., by about 10%, 20%, 30%, 40%, 50%, 60%, 70%, 80%, 90% or 100%). In further embodiments, the second heat sink 212 has a surface area that supports local surface plasmon excitation that is less than that of the NFT 112 (e.g., by about 10%, 20%, 30%, 40%, 50%, 60%, 70%, 80%, 90% or 100%, where 100% represents the omission of plasmonic material on the second heat sink 212).

Figure 4:
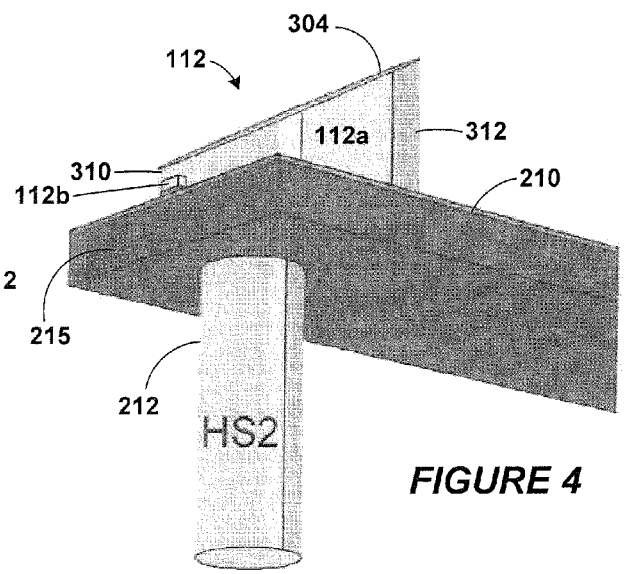
FIG. 4 is a perspective view of the near-field transducer shown in FIG. 3, with a channel waveguide spaced apart from the near-field transducer by a thin layer of dielectric material having a refractive index lower than that of the waveguide core in accordance with various embodiments.
Figure 5:
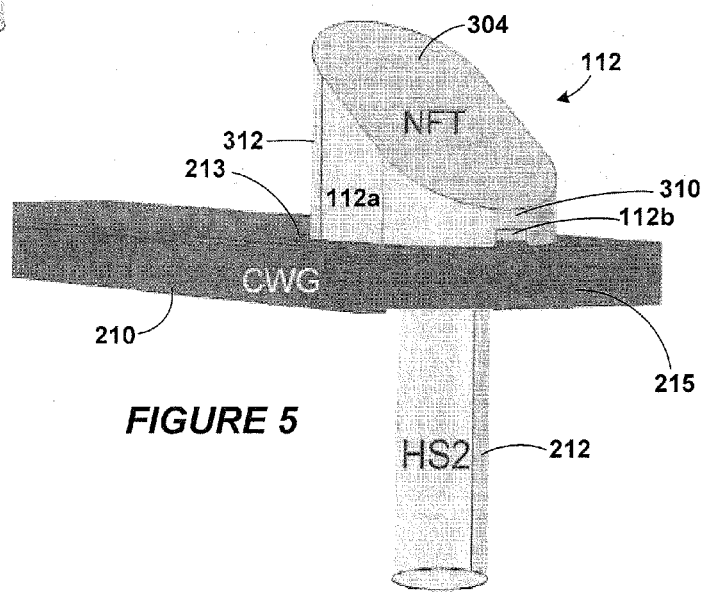
FIG. 5 is another perspective view of the near-field transducer shown in FIG. 3, with a channel waveguide spaced apart from the near-field transducer by a thin layer of dielectric material having a refractive index lower than that of the waveguide core in accordance with various embodiments.

FIGS. 4 and 5 are perspective views of the NFT 112 shown in FIG. 3 situated proximate a channel waveguide 210 with a dielectric layer 213 between the NFT 112 and channel waveguide 210 in accordance with various embodiments. The dielectric layer 213 has a refractive index lower than that of the core of the channel waveguide 210. For an NFT-above-CWG light delivery arrangement, such as that shown in FIGS. 4 and 5, freed up space on both sides of the channel waveguide 210 allows for incorporation of the second heat sink 212 shown in FIG. 3. The NFT 112 shown in FIGS. 4 and 5 is positioned near a distal end 215 of the channel waveguide 210, with the peg region 112b axially aligned with a longitudinal axis of the waveguide 210. In some embodiments, the distal end of the peg region 112b terminates at approximately the same location as the distal end 215 of the waveguide 210. In other embodiments, the distal end of the peg region 112b can terminate either short of or beyond the distal end 215 of the waveguide 210. As can be seen in FIGS. 4 and 5, a proximal portion of the second heat sink 212 passes through a distal portion of the channel waveguide 210. In this arrangement, the periphery of the distal portion of the heat sink 212 is fully encompassed by the waveguide 210.

The waveguide 210 has a length that largely depends on various features in the light coupling region, and therefore can vary as needed or desired. According to some embodiments, the waveguide 210 has a width of about 700 to 1,000 nm, and a thickness of about 50 to 200 nm. In various embodiments, the second heat sink 212 has a diameter of about 200 to 300 nm and a length of about 1 to 2 micron. It is understood that the second heat sink 212 may have a polygonal shape rather than a cylindrical shape or may otherwise include a combination of polygonal and cylindrical shapes.

Figure 6:
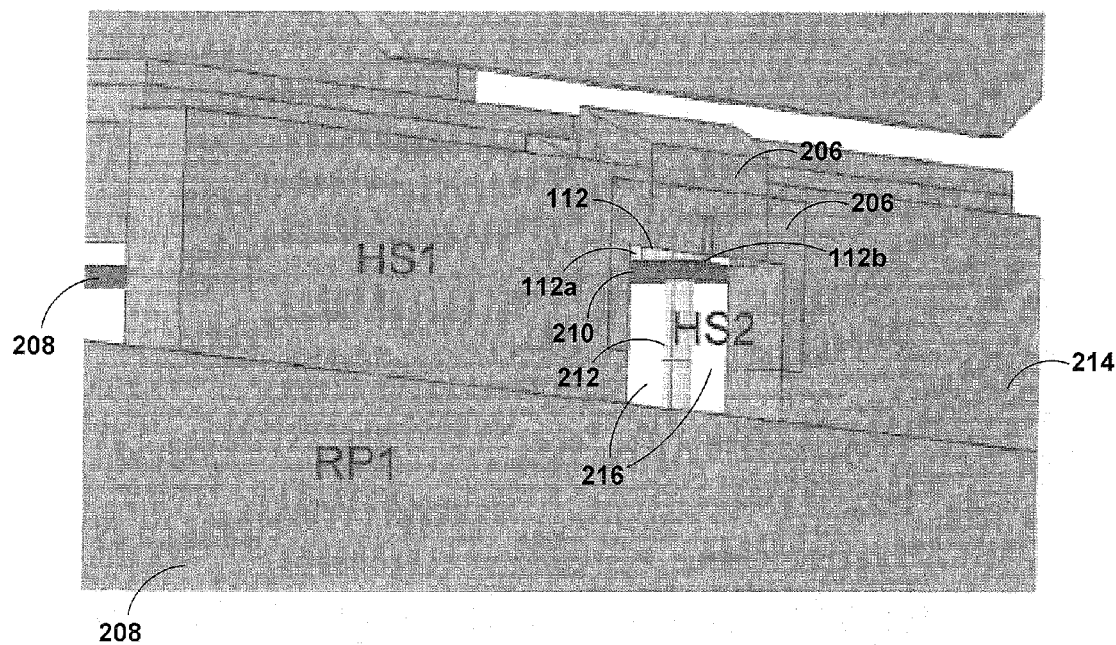
FIG. 6 is a perspective view of a medium-facing portion of a heat-assisted magnetic recording (HAMR) head including the near-field transducer shown in FIGS. 4 and 5 in contact with a heat reservoir component of the recording head in accordance with various embodiments.

FIG. 6 is a perspective view of a medium-facing portion of a heat-assisted magnetic recording (HAMR) head including the NFT-above-CWG arrangement shown in FIGS. 4 and 5 in contact with a heat reservoir component of the recording head in accordance with various embodiments. An embodiment consistent with FIG. 6 is directed to an apparatus comprising a slider of a HAMR head that supports an NFT and a writer. The NFT includes an enlarged region having a first surface and a peg region extending from the enlarged region. A first heat sink on the slider, which contacts a portion of the writer and a portion of the NFT, comprises a gap. A second heat sink is aligned with the gap of the first heat sink and extends across the gap and between the first surface of the enlarged region of the NFT and a heat reservoir component of the slider. An optical waveguide is situated proximate the first surface of the NFT and contacts a portion of the second heat sink. A thin dielectric material fills a gap between the first surface of the NFT and the waveguide. The dielectric material has a refractive index lower than that of the core of the waveguide. The optical waveguide has an elongated planar shape, a proximal end configured to receive optical energy from a light source, and a distal end. The gap in the first heat sink is dimensioned to receive the distal end of the optical waveguide. The gap is dimensioned to reduce or prevent deleterious light interaction with the first heat sink. In some embodiments, the second heat sink has an outer surface comprising a plasmonic material, and the second heat sink is configured to enhance plasmonic excitation of the NFT.

According to the embodiment shown in FIG. 6, thermal management at the NFT 112 is facilitated by a multiplicity of heat sinks. The first heat sink 214, as previously discussed, contacts the enlarged region 112a of the NFT 112 and may also contact a write pole 206 (hidden in FIG. 6 but pointed to by reference number 206) of the writer on the slider body. The first heat sink 214 is shown as a rectangular member oriented substantially parallel to the ABS surface of the slider, and in thermal contact with the return pole 208. The first heat sink 214 includes a gap 216 within which at least the distal ends of the peg region 112b and channel waveguide 210 are aligned or positioned. The gap region of the first heat sink 214 forms a shape similar to a shielding panel surrounding the channel waveguide 210, leaving a central portion 216 empty to prevent unwanted light interaction with the first heat sink 214. In some embodiments, the distal ends of the peg region 112b and channel waveguide 210 are oriented with, but do not extend through, the gap 216, while in other embodiments, the distal end of one or both of the peg region 112b and channel waveguide 210 can extend through the gap 216.

FIG. 6 further shows the second heat sink 212 extending from the enlarged region 112a of the NFT 112, continuing through a distal portion of the waveguide 210, and terminating at the return pole 208 of the writer. In this arrangement, a longitudinal axis of the second heat sink 212 is generally aligned with a centerline of the gap 216 within the first heat sink 214. In some embodiments, the second heat sink 212 is oriented with respect to the gap 216 but does not break the plane of the gap 216. In other embodiments, the second heat sink 212 is positioned so that it breaks the plane of the gap 216.

Figure 7:
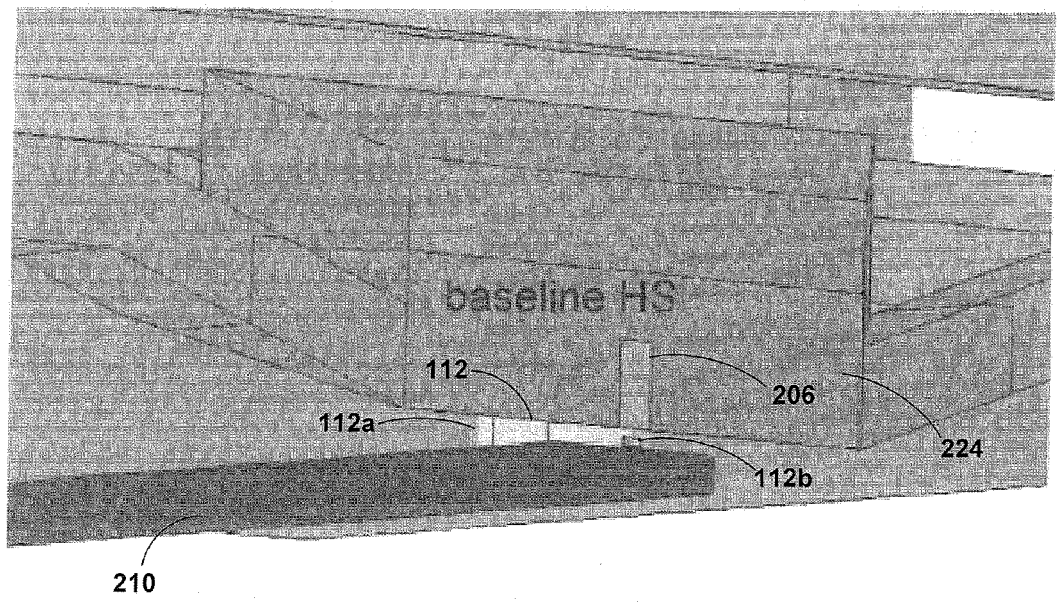
FIG. 7 is a perspective view of a medium-facing portion of a HAMR head including a near-field transducer that contacts a baseline heat sink and excludes the integral heat sink shown in FIGS. 3-5.

FIG. 7 is a perspective view of a medium-facing portion of a HAMR head including an NFT 112 that contacts a baseline heat sink 224 and excludes the second heat sink 212 shown in FIGS. 3-6. FIG. 7 shows other features, including the location of write pole 206, the enlarged region 112a and peg region 112b of the NFT 112, and the channel waveguide 210. The channel waveguide NFT configuration with a conventional heat sink arrangement shown in FIG. 7 is included to facilitate a discussion of the data presented in Table 1 below.

TABLE 1

| NFT Configuration | sMH | MT (K/mW) | TGx (K/nm) | CW70 (nm) |
|---|---|---|---|---|
| Standard | 5.66 | 43.6 | 3.269 | 351 |
| Case 1: Baseline NFT (conventional heat sink) | 4.16 (−27%) | 56.1 (+29%) | 4.545 (+39%) | 133 (−62%) |
| Case 2: Baseline NFT with dual heat sinks | 6.27 (+11%) | 56.5 (+30%) | 4.210 (+29%) | 148 (−58%) |
| Case 3: Adjusted NFT with dual heat sinks for double LSP | 6.84 (+20%) | 67.1 (+54%) | 4.246 (+30%) | 143 (−59%) |

Table 1 above shows a comparison of figures of merit (FOMs) for a number of different NFT configurations. The percentages in parenthesis refer to the percent change relative to the Standard NFT configuration. All of the NFTs tested in Table 1 have a stadium shape (sloped top, as shown in the Figures) NFT body with dimensions optimized for TGx (thermal gradient). All of the non-Standard NFTs are of an NFT-above-CWG light delivery design. The Standard NFT configuration refers to a circular disc-type NFT having a peg and a solid immersion mirror (SIM) focusing light onto the NFT and having a planar waveguide. The Baseline configuration of Case 1 refers to a Baseline NFT without an improved heat sink design according to the various disclosed embodiments. The Baseline NFT with dual heat sinks of Case 2 refers to a Baseline NFT with an improved heat sink design according to the various disclosed embodiments. The Adjusted NFT with dual heat sinks of Case 3 refers to a Baseline NFT with adjusted dimensions and an improved heat sink design according to the various disclosed embodiments.

The NFT configuration of Case 1 (shown in FIG. 7) having a conventional heat sink shows a significant degradation of media-to-head temperature (MH) ratio while other FOMs are improved by a large amount. This penalty of higher head temperature (low MH) can be mitigated by employing a better heat sink of a type disclosed herein with relatively small reduction in other FOMs. The NFT configuration of Case 2 uses the same NFT as in Case 1 but includes the multiple heat sinks of the present disclosure. The second heat sink (e.g., heat sink 212 in the Figures) in Case 2 does not incorporate plasmonic material. The improved heat sink arrangement of Case 2 results in a significant improvement in MH ratio over that of Case 1.

The NFT configuration of Case 3 uses an NFT with adjusted dimensions relative to that of Cases 1 and 2 and, in addition, employs an improved heat sink arrangement including a second heat sink 212 as shown in the Figures with plasmonic material in accordance with embodiments of the present disclosure. The dimensions of the NFT of Case 3 were adjusted to facilitate a local surface plasmon (LSP) resonance effect at the second heat sink. The adjustments made to the NFT dimensions include increasing the width of NFT from 400 nm to 420 nm and reducing the overall length of NFT from 680 nm to 620 nm. The data for the Case 3 NFT configuration shows an MH ratio improved beyond that of the Case 2 NFT configuration. Notably, a large improvement is observed in MT (media temperature rise per mW). TGx (thermal gradient in the recording layer in the downtrack direction) and CW70 (width of 70% of temperature profile to peak value in the recording layer measured in the cross-track direction) are still improved slightly when compared with the NFT configuration of Case 2.

FIG. 8 is a flow diagram of a method of managing thermal conditions at a near-field transducer of a HAMR head in accordance with various embodiments. The method illustrated in FIG. 8 involves communicating 802 optical energy through a channel waveguide of a recording head, causing 804 the energy to propagate to a near-field transducer proximate a write pole and a media-facing surface of the recording head, and causing 806 a surface plasmon resonance of the near-field transducer to heat a magnetic recording medium. The method also involves conducting 808 heat away from the near-field transducer via a first heat sink of the recording head, and conducting 810 heat away from the near-field transducer via a second heat sink of the recording head that extends across a gap of the first heat sink. In some embodiments, the method further involves causing a surface plasmon resonance of the second heat sink that enhances surface plasmon resonance of the near-field transducer.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus, comprising:
   a writer comprising a write pole and a return pole;
   a near-field transducer (NFT) comprising an enlarged region having a first surface, a second surface, and a peg region extending from the enlarged region;
   a first heat sink comprising a gap and contacting the writer and the NFT;
   a second heat sink extending across the gap of the first heat sink and between the first surface of the enlarged region of the NFT and the return pole;
   an optical waveguide proximate the first surface of the NFT and contacting a portion of the second heat sink; and
   a dielectric layer between the NFT and the optical waveguide.

2. The apparatus of claim 1, wherein the second heat sink has an outer surface comprising a plasmonic material and is configured to enhance plasmonic excitation of the NFT.

3. The apparatus of claim 1, wherein the dielectric layer has a refractive index lower than that of the optical waveguide.

4. The apparatus of claim 1, wherein:
the optical waveguide has an elongated planar shape, a proximal end configured to receive optical energy from a light source, and a distal end; and
the gap in the first heat sink is dimensioned to receive the distal end of the optical waveguide.

5. The apparatus of claim 1, wherein the gap is dimensioned to reduce or prevent deleterious light interaction with the first heat sink.

6. The apparatus of claim 1, wherein the optical waveguide is a channel waveguide.

7. The apparatus of claim 1, wherein the portion of the second heat sink is encompassed by the optical waveguide.

8. The apparatus of claim 1, wherein the second heat sink is oriented substantially normal to the first surface of the NFT.

9. The apparatus of claim 1, wherein the second heat sink has a generally cylindrical shape.

10. The apparatus of claim 1, wherein:
the NFT has a second sloped surface opposing the first surface and contacting the write pole;
the first surface of the NFT is substantially planar; and
the second heat sink extends substantially normal from the first surface of the NFT.

11. The apparatus of claim 10, wherein NFT further comprises a first side surface from which the peg region extends and an opposing second side surface, the first side surface of the NFT contacting the first heat sink.

12. The apparatus of claim 1, wherein:
the NFT has a second sloped surface opposing the first surface and a first side surface from which the peg region extends;
the first surface of the NFT is substantially planar;
the second heat sink extends substantially normal from the first surface of the NFT; and
the optical waveguide has a generally rectangular shape with a distal end terminating proximate a distal end of the peg region.

13. An apparatus, comprising:
a slider of a heat assisted magnetic recording head;
a writer on the slider;
a near-field transducer (NFT) on the slider and comprising:
an enlarged region having a first surface; and
a peg region extending from the enlarged region;
a first heat sink on the slider and comprising a gap, the first heat sink contacting a portion of the writer and a portion of the NFT;
a second heat sink aligned with the gap of the first heat sink and extending between the first surface of the enlarged region of the NFT and a heat reservoir component of the slider;
an optical waveguide proximate the first surface of the NFT and contacting a portion of the second heat sink; and
a dielectric layer between the NFT and the optical waveguide.

14. The apparatus of claim 13, wherein the second heat sink has an outer surface comprising a plasmonic material and is configured to enhance plasmonic excitation of the NFT.

15. The apparatus of claim 13, wherein the dielectric layer has a refractive index lower than that of the optical waveguide.

16. The apparatus of claim 13, wherein:
the optical waveguide has an elongated planar shape, a proximal end configured to receive optical energy from a light source, and a distal end; and
the gap in the first heat sink is dimensioned to receive the distal end of the optical waveguide.

17. The apparatus of claim 13, wherein the gap is dimensioned to reduce or prevent deleterious light interaction with the first heat sink.

18. A method comprising:
communicating optical energy through a channel waveguide of a recording head;
causing the energy to propagate to a near-field transducer proximate a write pole and a media-facing surface of the recording head, the energy causing a surface plasmon resonance of the near-field transducer to heat a magnetic recording medium;
conducting heat away from the near-field transducer via a first heat sink of the recording head; and
conducting heat away from the near-field transducer via a second heat sink of the recording head that extends across a gap of the first heat sink.

19. The method of claim 18, wherein the energy causes a surface plasmon resonance of the second heat sink that enhances surface plasmon resonance of the near-field transducer.

20. The method of claim 18, wherein:
the second heat sink passes through a portion of the channel waveguide; and
the gap is dimensioned to reduce or prevent deleterious light interaction with the first heat sink.

* * * * *